(12) United States Patent
Winkler et al.

(10) Patent No.: US 6,261,005 B1
(45) Date of Patent: Jul. 17, 2001

(54) ROLLING BEARING CAGE

(75) Inventors: Manfred Winkler, Aurachtal; Herbert Zettner, Herzogenaurach; Herbert Rost, Herzogenaurach; Walter Wildeshaus, Herzogenaurach; Erwin Staudigel; Tino Beck, both of Höchstadt/Aisch, all of (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/452,077

(22) Filed: Nov. 30, 1999

(30) Foreign Application Priority Data

Dec. 4, 1998 (DE) .............................. 198 56 024

(51) Int. Cl.$^7$ ...................................... F16C 33/46
(52) U.S. Cl. ............................................. 384/577
(58) Field of Search ............................... 384/577

(56) References Cited

U.S. PATENT DOCUMENTS

| 3,399,008 |   | 8/1968 | Farrell et al. ........................ 384/577 |
| 5,033,876 | * | 7/1991 | Kraus .................................. 384/577 |
| 5,178,474 | * | 1/1993 | Muntnich et al. .................... 384/577 |

FOREIGN PATENT DOCUMENTS

| 3041860 | 6/1982 | (DE) . |
| 3411493 | 10/1984 | (DE) . |
| 3928913 | 3/1990 | (DE) . |
| 4007452 | 9/1991 | (DE) . |
| 4337948 | 5/1995 | (DE) . |

* cited by examiner

*Primary Examiner*—Thomas R. Hannon
(74) *Attorney, Agent, or Firm*—Bierman. Muserlian and Lucas

(57) ABSTRACT

The invention concerns a rolling bearing cage (1, 21) made of a resilient plastic and comprising at at least one peripheral point, an axially extending gap (2) formed by a first cage end (4) and a second cage end (3) which is spaced from the first cage end (4), each of the first and the second cage ends (4, 3) comprising at least one projection and at least one recess, said recess and projection having complementary shapes, and as viewed in axial direction, the recess and the projection partially engage each other, and as viewed in peripheral direction, the recess and the projection partially overlap each other. The novel cage of the invention is characterized in that, as seen in a radial top view of the gap (2), limiting surfaces (9, 10) of the projection (5) and the recess (6) situated opposite each other in axial direction on two sides of the gap are inclined relative to end faces (17) of the cage (1, 21) so that a dovetail profile is formed which enables the two cage ends (3, 4) to be displaceable relative to each other in peripheral direction, so that an expansion of the cage (1, 21) is stopped when the limiting surfaces (9, 10) situated opposite each other in axial direction bear against each other and a compression of the cage is stopped when limiting surfaces (11, 12) of the projection (5) and the recess (6) situated opposite each other in peripheral direction bear against each other. In this way, a cage (1, 21) is created that allows almost no axial and no radial offset between the two ends (3, 4) of the cage but permits an exactly defined displacement of the cage ends (3, 4) in both peripheral directions.

6 Claims, 2 Drawing Sheets

A - A

ROLLING BEARING CAGE

FIELD OF THE INVENTION

The invention concerns a rolling bearing cage for cylindrical or needle rollers, said cage being made of a resilient plastic and comprising at at least one peripheral point, an axially extending gap formed by a first cage end and a second cage end which is spaced from the first cage end, each of the first and the second cage ends comprising at least one projection and at least one recess, said recess and projection having complementary shapes, and as viewed in axial direction, the recess and the projection partially engage each other, and as viewed in peripheral direction, the recess and the projection partially overlap each other.

BACKGROUND OF THE INVENTION

A rolling bearing cage of the pre-cited type is known from DE 40 07 452 A1. The two ends of the cage are separated by an axial gap and each end comprises two projections which cooperate with recesses on the other cage end. The projections are configured so that, as viewed in axial direction, they engage each other partially and as viewed in peripheral direction, they overlap each other partially. This assures that the cage is fixed both in axial and in radial direction i.e., the two cage ends cannot be displaced relative to each other in axial or in radial direction. However, in peripheral direction, the cage ends are displaceable relative to each other, so that a compression of the cage is stopped when the projections and the opposing recesses bear against one another. An expansion of the cage, in contrast, is not limited. This can be a drawback during assembly because it is possible for several cages to get entangled with one another. Furthermore, assembly is also rendered more difficult because an excessive expansion of such a cage would require more force to insert it into a bore of smaller diameter.

OBJECTS OF THE INVENTION

It is therefore an object of the invention to improve a cage of the pre-cited type so that the above drawbacks are eliminated by providing that although the cage ends are displaceable relative to each other in peripheral direction, their displacement in both peripheral directions is still limited.

This and other objects and advantages of the invention will become obvious from the following detailed description.

SUMMARY OF THE INVENTION

The invention achieves the above objects by the fact that, as seen in a radial top view of the gap, limiting surfaces of the projection and the recess situated opposite each other in axial direction are inclined relative to end faces of the cage so that a dovetail profile is formed which enables the first and the second cage end to be displaceable relative to each other in peripheral direction, so that an expansion of the cage is stopped when the limiting surfaces situated opposite each other in axial direction bear against each other and a compression of the cage is stopped when limiting surfaces of the projection and the recess situated opposite each other in peripheral direction bear against each other.

The cage ends of the rolling bearing cage of the invention comprise a projection and a recess which are configured so that the projection is situated within the recess and extends in peripheral direction. Due to the fact that the projection and the recess engage each other in axial direction, a relative axial displacement of the two cage ends is prevented. In a radial top view of the gap region of the cage, the two cage ends are situated next to each other but the projection and the recess, and the projections of the two cage ends overlap each other so that it is assured that the two cage ends are retained in one and the same peripheral plane, that is to say that they cannot slip radially over each other. Finally, the dovetail profile enables the cage ends to move relative to each other in peripheral direction but only to a limited extent. The compression of the cage is terminated when the projection has sunk completely into the associated recess i.e. when limiting surfaces of the projection and the recess parallel to the cage axis bear directly against each other. The expansion of the cage is likewise possible only to a limited extent, viz., only till the inclined limiting surfaces of the projection and the recess situated opposite each other in axial direction come to bear directly against each other.

In a preferred embodiment of the invention, the first cage end comprises two outer projections formed directly adjoining the end faces of the cage and corresponding to two opposing recesses formed in the second cage end. These two outer projections of the first cage end are defined by a recess which corresponds to two spaced-apart projections of the second cage end. This symmetric configuration of the two cage ends enables a uniform mutual support thereof and thus prevents any bracing that may otherwise occur.

According to a further feature of the invention, the overlap between the projections of the first and second cage ends is formed by a step of each projection in that a step of the projection of the first cage end accessible radially from the outside corresponds to a step of the projection of the second cage end accessible radially from the inside, and vice versa.

The projections of the second cage end engage the recess of the first cage end which is formed as a step, whereby the projections are supported so that a radial offset between the two cage ends is prevented while a relative movement of the cage ends in peripheral direction is permitted.

A radial offset between the cage ends may also be prevented by realizing the overlap between the projections by providing a groove in the projection of the first cage end, which groove is engaged by an associated elevation arranged on the projection of the second cage end. This groove may have a rectangular, triangular or semi-circular cross-section.

Finally, according to still another advantageous feature of the rolling bearing cage of the invention, the thickness of the region of overlap does not exceed the thickness of the rolling bearing cage.

The invention will now be described more closely with the help of the following examples of embodiments represented in the drawings.

DESCRIPTION OF THE DRAWINGS

Figure 1:
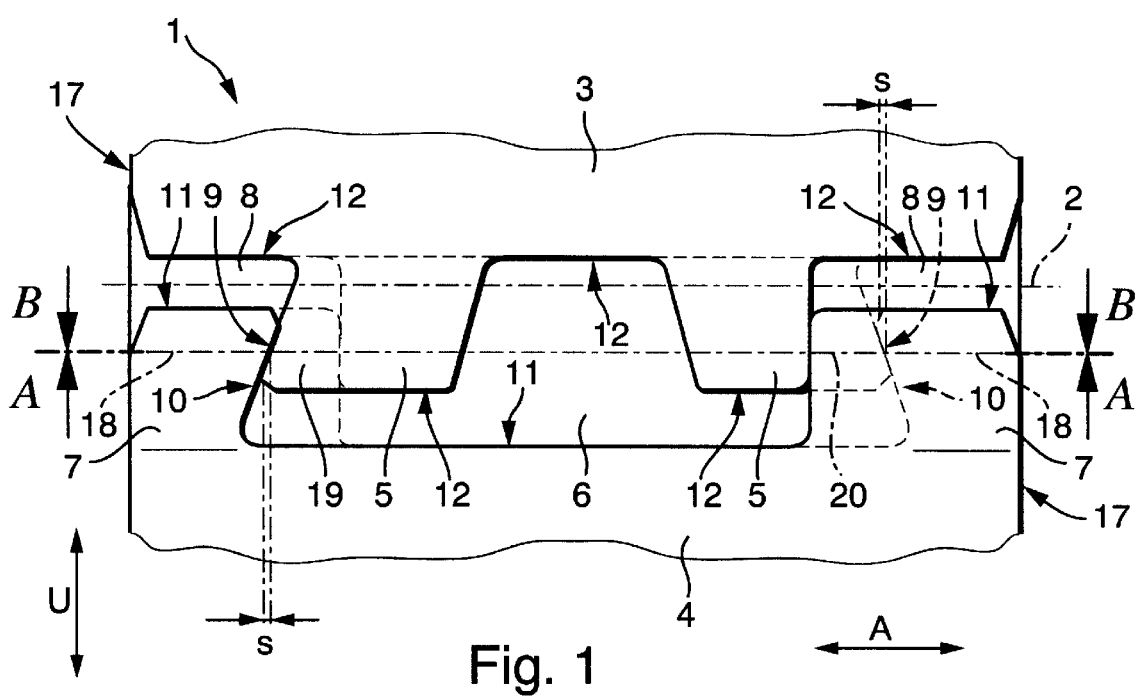
FIG. 1 is a radial top view of the gap region of a rolling bearing cage of the invention.

A rolling bearing cage identified at 1 in FIG. 1 comprises an axial gap 2 which is defined by a first and a second cage end 4 and 3 which are spaced apart in peripheral direction. This partial representation of the cage 1 does not show the circumferentially uniformly spaced pockets for rolling elements in the form of needle rollers. The first cage end 4 comprises two outer projections 7 which are disposed directly adjoining the end faces 17 of the cage 1. These projections 7 engage recesses 8 of the second cage end 3. This second cage end 3 likewise comprises two projections 5 which are spaced from each other and engage a recess 6 of the first cage end 4. This arrangement of the projections 5 and 7 and the recesses 6 and 8 prevents the two cage ends 3 and 4 from being displaced through the distance A in the direction of the cage axis 18.

Figure 2:
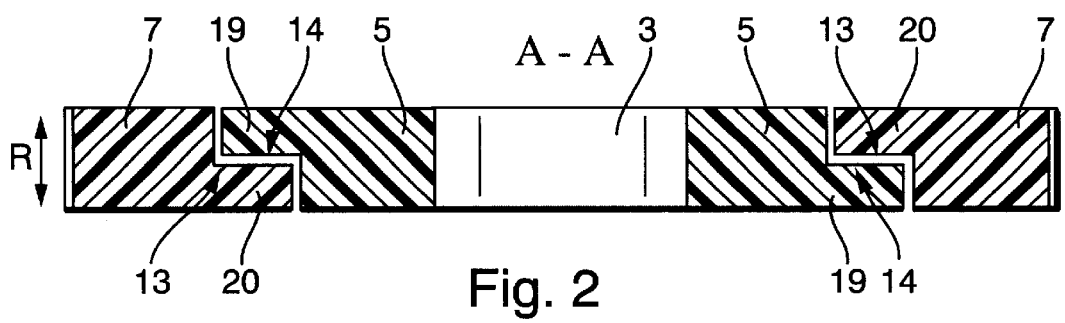
FIG. 2 is a longitudinal cross-section through the cage of FIG. 1.
Figure 3:
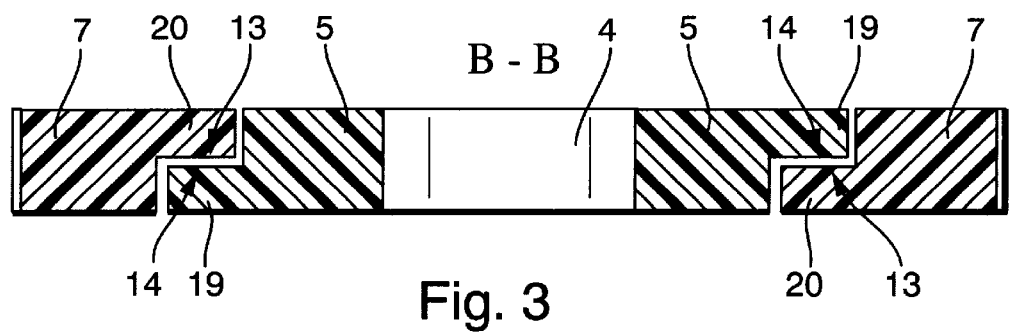
FIG. 3 is another longitudinal cross-section through the cage of FIG. 1.

FIGS. 2 and 3 show the overlap between the two cage ends 3 and 4. From this, it can be clearly seen that the two cage ends are movable relative to each other in peripheral direction but a movement in radial directions R is prevented. This is achieved by the fact that each of the projections 7, 5 is formed with a step 13, 14 which is complementary to the step 14, 13 of the other projection 5, 7. This means that the projection 7 comprises a step 13 which forms a recess that is engaged by a nose 19 of the projection 5, while the projection 5 comprises a step 14 that is engaged by a nose 20 of the projection 7. The steps 13 and 14 are accessible alternately radially from the outside and radially from the inside.

It can be further seen from the top view of FIG. 1 that the limiting surfaces 9 of the projection 5 and the limiting surfaces 10 of the recess 6 are inclined relative to the end faces 17 on both sides of the cage 1, (on the left of the figure, these surfaces are on the upper side and therefore visible, and on the right, they are on the lower side and therefore represented in dashes) so that a positive overlap s in the form of a dovetail profile is obtained which limits the expansion of the cage 1. This means that the cage 1 can only be expanded till the two limiting surfaces 9 and 10 come to bear directly against each other. If, in contrast, the cage 1 is pressed together i.e., reduced in diameter, the projections 5 and 7 sink completely into the recesses 6 and 8 respectively, so that the projections 5 rest firmly against the limiting surface 11 of the recess 6 and the projections 7 rest firmly against the limiting surface 12 of the recess 8.

In this state, a gap is formed between the limiting surface 9 of the projection 5 and the limiting surface 10 of the recess 6. This inventive configuration of the cage 1 guarantees that neither a radial nor an axial offset between the two cage ends 3 and 4 is possible but, at the same time, permits a limited relative movement between the cage ends 3 and 4 in peripheral directions U.

Figure 4:
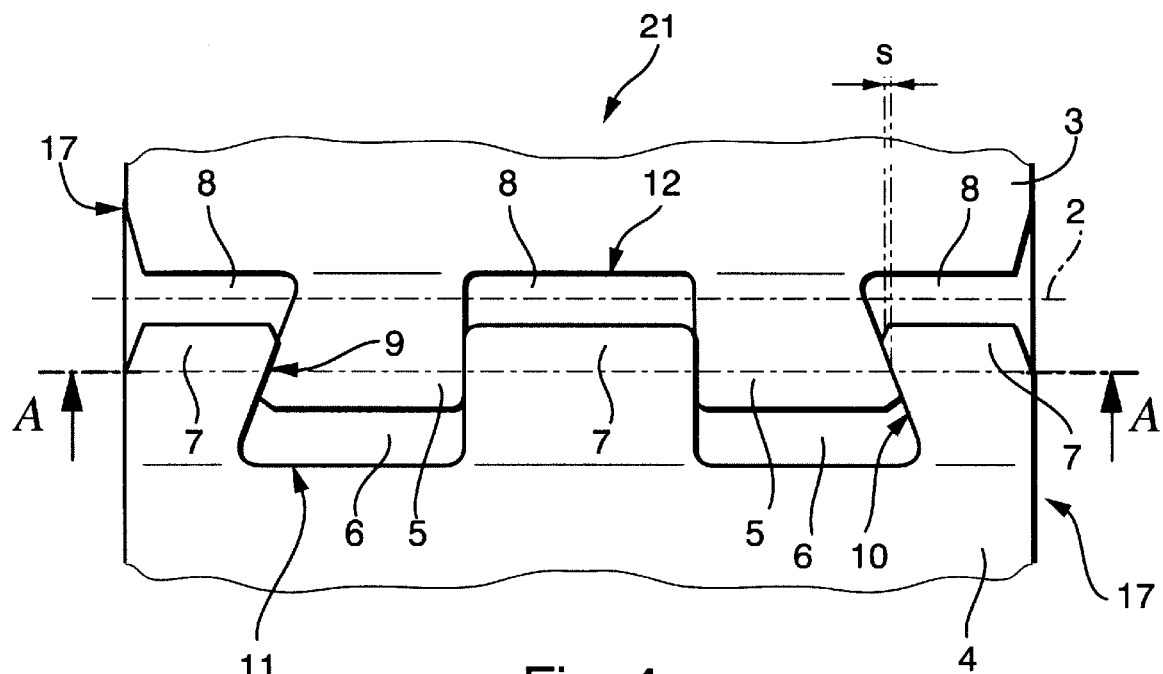
FIG. 4 is a radial top view of the gap region of a further embodiment of a rolling bearing cage of the invention.
Figure 5:
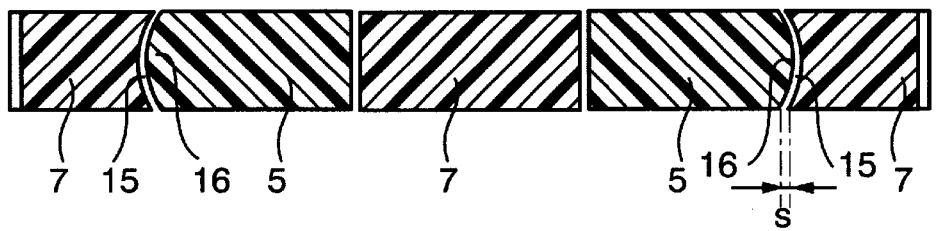
FIG. 5 is a longitudinal cross-section through the cage of FIG. 4.

The distinctive feature of the cage 21 shown in FIGS. 4 and 5 is that the radial offset between the two cage ends 3 and 4 is prevented by the fact that an elevation 16 on the projection 5 is snapped into a groove 15 in the projection 7. In the present example, the groove 15 is semi-circular in shape but it may be configured with any other shape.

What is claimed is:

1. A rolling bearing cage for cylindrical or needle rollers, said cage being made of a resilient plastic and comprising at least one peripheral point, an axially extending gap formed by a first cage end and a second cage end which is spaced from the first cage end, each of the first and the second cage ends comprising at least one projection and at least one recess, said recess and projection having complementary shapes, and as viewed in axial direction, the recess and the projection partially engage each other, and as viewed in peripheral direction, the recess and the projection overlap each other, characterized in that, as seem in a radial top view of the gap, limiting surfaces of the projection and the recess situated opposite each other in axial direction on two sides of the gap are inclined relative to end faces of the cage so that a dovetail profile is formed which enables the first and the second cage end to be displaceable relative to each other in peripheral direction, so that an expansion of the cage is stopped when the limiting surfaces situated opposite each other in axial direction bear against each other and a compression of the cage is stopped when limiting surfaces of the projection and the recess situated opposite each other in peripheral direction bear against each other.

2. Rolling bearing cage of claim 1 wherein the first cage end comprises two outer projections formed directly adjoining the end faces of the cage and corresponding to two opposing recesses formed in the second cage end, said two outer projections of the first cage end being defined by a recess which corresponds to two spaced-apart projections of the second cage end.

3. Rolling bearing cage of claim 2 wherein an overlap between the projections of the first and second cage ends is formed by a step of each projection in that a step of the projection of the first cage end accessible radially from the outside corresponds to a step of the projection of the second cage end accessible radially from the inside, and vice versa.

4. Rolling bearing cage of claim 3 wherein a thickness of the overlap does not exceed a thickness of the rolling bearing cage.

5. Rolling bearing cage of claim 2 wherein an overlap between the projections of the first and the second cage ends is achieved in that a groove arranged in the projection of the first cage end is engaged by an elevation arranged on the projection of the second cage end.

6. Rolling bearing cage of claim 5 wherein the groove has one of a rectangular, a triangular or a semi-circular cross-section.

* * * * *